Patented Feb. 16, 1937

2,070,582

UNITED STATES PATENT OFFICE 2,070,582

MAKING SUPERPHOSPHATE

Harry A. Curtis, Knoxville, Tenn., assignor to Tennessee Valley Authority, Wilson Dam, Ala., a corporation No Drawing. Application October 9, 1935, Serial No. 44,272

3 Claims. (Cl. 23—109)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process of making triple superphosphate, particularly from fine phosphate rock and concentrated phosphoric acid.

One of the objects of my invention is to carry out the several steps of the process of making superphosphate from fine phosphate rock, or calcium carbonate, and concentrated phosphoric acid with a minimum expenditure of power. Another object of my invention is to reduce to a minimum the time required to bring the superphosphate to a granular, essentially dry condition such that it may be stored without subsequent agglomeration.

When fine phosphate rock, or fine calcium carbonate, and concentrated phosphoric acid are mixed quickly, there is a short period of time during which the mixture remains fluid. This period of time is short, but it is not too short to permit a thorough mixing of the fine rock and acid if a sufficiently high speed mixer be used. As soon as the chemical reaction between the fine phosphate rock, or the fine calcium carbonate, and the concentrated phosphoric acid begins, the mixture starts to thicken. The chemical reaction also liberates heat which causes a rapid increase in the rate of reaction. The result is that the mixture thickens very rapidly and in a short time reaches a condition in which it may be crumbled into small pieces very easily. Subsequent to this stage the material hardens and sets up into reasonably hard, discrete masses.

In my co-pending application, application Ser. No. 726,757, filed May 21, 1934, now Patent 2,053,266 I have disclosed the method of making superphosphate from fine phosphate rock and concentrated phosphoric acid which involves the intimate mixing of the mixture of phosphate rock and acid through the stage of high fluidity and this mixing continued throughout the plastic stage until the mixture breaks up into small discrete masses. My present process is an improvement on the process previously disclosed, particularly in respect to the fact that fine phosphate rock and the concentrated phosphoric acid are intimately mixed only during the period of high fluidity of the mixture.

I have discovered a process for making superphosphate which requires a minimum expenditure of power and reduces to a minimum the time required to bring the superphosphate to a granular, essentially dry condition, which comprises the combination of process steps of effectively mixing the charge in a paddle type mixer operated at a sufficiently high speed to insure a thorough mixing of the charge while in a fluid condition and only for the duration of the high fluidity of the mixture, conveying away the product without further mixing for a sufficient period of time for the reaction to continue, during which the mixture passes through the plastic stage and crumbles on disturbing the mixture, such as by discharging the contents of the first conveyor onto a second conveyor, and conveying the crumbly mixture for a sufficient time for the reaction to be continued further so that the mixture forms lumps which do not agglomerate in storage.

One example of the operation of my process is given for making the mono-calcium phosphate from fine phosphate rock and concentrated phosphoric acid. A phosphate rock, ground so that 20% passes a 200 mesh screen, and concentrated phosphoric acid, containing 75% by weight of $H_3PO_4$, were charged at the rate of 900 lbs. per hour and 1,040 lbs. per hour respectively into a continuous vertical paddle or arm mixer with a horizontal section of approximately 4" x 6" and with a depth of approximately 4" equipped with two vertical shafts, each 1" in diameter, carrying blades which describe a circle of approximately 4" in diameter. The material was mixed rapidly while in the fluid state and for the period of duration of high fluidity of the mixture and then discharged from the mixer. The time required for the passage of the charge through the mixer was approximately 15 seconds. The power consumption was at the rate of approximately ¼ H. P., which is equivalent to 0.28 H. P.-hr. per ton. The mixture was discharged onto a conveyor and moved along without substantial disturbance for a sufficient period of time for the reaction to continue while the mass passed through the plastic stage and set up sufficiently so that it crumbled on disturbance. This time was approximately two to three minutes. The contents of this first conveyor were discharged onto a second conveyor and in so doing the mass broke up into crumbly lumps. This crumbly material was conveyed away on the second conveyor for a sufficient period of time for the reaction to continue further and the lumps to reach a condition in which they did not agglomerate in storage. This time was approximately ten minutes. The contents of the second conveyor were discharged onto the storage pile where the product was available for a minimum of processing at the time of bagging and shipping.

The small amount of power for the mixing, as given above, may be compared by way of example with the results obtained in a certain commercial installation in which a continuous horizontal mixer was designed not only to accomplish the mixing through the stage of high fluidity but through the plastic stage until the product was discharged in the form of individual pieces or agglomerates. In this commercial unit the phosphate rock, ground so that 80% passed through a 200 mesh screen, and phosphoric acid, containing 76% by weight of $H_3PO_4$, were charged at the rate of 2600 lbs. per hour and 2900 lbs. per hour respectively. The continuous horizontal mixer was approximately 10' x 32'', with a depth of 24'', and equipped with two horizontal shafts, each approximately 5'' in diameter and carrying blades which described a circle of approximately 17'' in diameter. The material was mixed through the fluid and plastic stages and was discharged in the form of individual pieces or agglomerates. The time required for the passage of the charge through the mixer was approximately two minutes. The power consumption was at the rate of approximately 30 H. P., which is equivalent to 11 H. P.-hr. per ton of charge.

Attention is called to the fact that in carrying out the mixing steps in the continuous horizontal mixer mentioned above, the power required was 11 H. P.-hr. per ton of charge, while in carrying out the mixing step in accordance with the present invention, the power required was 0.28 H. P.-hr. per ton.

It is evident that there are numerous factors which will influence conditions for the most satisfactory operation of my invention, the actual limits of which can not be established except by detailed study of each set of raw materials in the intermediate and finished product involved.

Fine phosphate rock or a calcium carbonate, such as fine limestone or fine marble, may be used as the source of the calcium compound which may be reacted with the concentrated phosphoric acid to form the superphosphate, which is essentially mono-calcium phosphate. The calcium compound used should be reduced to a relatively fine state of division but the requirements in this connection will vary, depending upon the nature of this constituent of the charge and whether or not it is a mineral or an intermediate or a refined product. In using the phosphate rock with the concentrated phosphoric acid, it has been found desirable to have a substantial proportion of the rock of such a size that it will pass through a 100 mesh screen.

The concentrated phosphoric acid used should contain at least 65% by weight of $H_3PO_4$, with concentrations of 75% to 85% normally being preferred. A small proportion of concentrated sulfuric acid in the concentrated phosphoric acid may be used without departing from the spirit or scope of this invention. It is preferred that the concentrated phosphoric acid contain a sufficient amount of water to supply the water of hydration for the mono-calcium phosphate being produced.

My process is particularly advantageous in that a much smaller mixing unit of lighter construction may be used than is possible when the mixture is agitated either through a part or all of the plastic range of the mixture. Stated in another way, the high speed mixer for mixing the constituents of the charge only throughout the range of high fluidity permits a much greater feed rate, expressed in terms of tons per hour per cubic feet of mixer volume. Consequently a much smaller prime-mover, such as an electric motor, is required for operating the unit with not only a lower installation cost but a very materially reduced cost for the power required for the operation. The material discharged from the mixer is conveyed away at a slow rate of speed for a sufficient length of time to permit the chemical reaction to proceed until the material has passed through the plastic stage and will crumble on disturbance. After any reasonable disturbance, such as moving from the first conveyor to a second conveyor, the material is moved along at a slow rate of speed for a sufficient time for the reaction to have proceeded to such an extent that the crumbly material sets into lumps which do not agglomerate in storage. This material on the second conveyor is ordinarily discharged onto a storage pile from which it is withdrawn for sizing and packing for shipment. It will be seen that the time required for the steps of mixing, conveying, disintegrating, and further conveying the mixture, usually 10 to 20 minutes, is of such an order as to be used practically in manufacturing and storage buildings of the type commonly used in the fertilizer industry.

It will be seen, therefore, that this invention actually may be carried out by the modification of certain details without departing from its spirit or scope.

I claim:

1. Process of treating phosphate rock with concentrated phosphoric acid, which comprises, mixing the fine phosphate rock and the concentrated phosphoric acid, containing 75% to 85% by weight of $H_3PO_4$, in the proportions to form mono-calcium phosphate, in a paddle type mixer operated at a sufficiently high speed to insure a thorough mixing of the charge while in a highly fluid condition and for the duration of the high fluidity of the mixture, which is approximately one minute; conveying away the mixture without further agitation during this first conveying period for a sufficient period of time for the reaction to continue, for the mixture to pass through the plastic stage, and for the mixture to crumble on disturbance, which is a period of approximately two to three minutes; discharging the contents of the conveyor onto a second conveyor in such a manner that the material is broken up and crumbled thereby; conveying away the crumbly mixture without further agitation during this second conveying period, for a sufficient period of time for the reaction to continue further and for the mixture to form lumps which do not agglomerate in storage, which is approximately eight to twelve minutes; and discharging the contents of the second conveyor.

2. Process of treating limestone with concentrated phosphoric acid, which comprises, mixing the fine limestone and the concentrated phosphoric acid, containing 75% to 85% by weight of $H_3PO_4$, in the proportions to form mono-calcium phosphate, in a paddle type mixer operated at a sufficiently high speed to insure a thorough mixing of the charge while in a highly fluid condition and for the duration of the high fluidity of the mixture; conveying away the mixture without further agitation during this first conveying period for a sufficient period of time for the reaction to continue, for the mixture to pass through the plastic stage, and for the mixture to crumble on disturbance; discharging the contents of the conveyor onto a second conveyor in such a manner that the material is broken up and crumbled thereby; conveying away the crumbly mixture without further agitation during this second conveying period for a sufficient period of time for the reaction to continue further and for the mixture to form lumps which do not agglomerate in storage; and discharging the contents of the second conveyor.

3. Process of treating a calcium compound, selected from the group consisting of phosphate rock and calcium carbonate, with concentrated phosphoric acid, which comprises, mixing the fine calcium compound and the concentrated phosphoric acid, containing at least 65% by weight of $H_3PO_4$, in the proportions to form mono-calcium phosphate, in a paddle type mixer operated at a sufficiently high speed to insure thorough mixing of the charge while in a highly fluid condition and for the duration of the high fluidity of the mixture; conveying away the mixture without further agitation during this first conveying period for a sufficient period of time for the reaction to continue, for the mixture to pass through the plastic stage, and for the mixture to crumble on disturbance; discharging the contents of the conveyor onto a second conveyor in such a manner that the material is broken up and crumbled thereby; and conveying away the crumbly mixture without further agitation during this second conveying period for a sufficient period of time for the reaction to continue further and for the mixture to form lumps which do not agglomerate in storage.

HARRY A. CURTIS.